US010308223B2

(12) United States Patent
Tani (10) Patent No.: US 10,308,223 B2
(45) Date of Patent: Jun. 4, 2019

(54) IN-VEHICLE DEVICE AND VEHICLE SECURITY SYSTEM (71) Applicants: AUTONETWORKS TECHNOLOGIES, LTD., Yokkaichi-shi, Mie (JP); SUMITOMO WIRING SYSTEMS, LIMITED, Yokkaichi-shi, Mie (JP); SUMITOMO ELECTRIC INDUSTRIES, LTD., Osaka-shi, Osaka (JP)

(72) Inventor: Kentaro Tani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/075,482

(22) PCT Filed: Feb. 27, 2017

(86) PCT No.: PCT/JP2017/007352
§ 371 (c)(1),
(2) Date: Aug. 3, 2018

(87) PCT Pub. No.: WO2017/150411
PCT Pub. Date: Sep. 8, 2017

(65) Prior Publication Data
US 2019/0039572 A1 Feb. 7, 2019

(30) Foreign Application Priority Data
Feb. 29, 2016 (JP) .................................. 2016-037331

(51) Int. Cl.
*B60R 25/10* (2013.01)
*B60R 25/31* (2013.01)
*B60R 25/24* (2013.01)
(52) U.S. Cl.
CPC .............. *B60R 25/31* (2013.01); *B60R 25/10* (2013.01); *B60R 25/24* (2013.01)
(58) Field of Classification Search
CPC .......... B60R 25/31; B60R 25/10; B60R 25/24
See application file for complete search history.

(56) References Cited

U.S. PATENT DOCUMENTS 5,281,949 A * 1/1994 Durley ..................... B60Q 1/50
180/167
6,034,617 A * 3/2000 Luebke .............. G07C 9/00309
307/10.2
(Continued)

FOREIGN PATENT DOCUMENTS

JP  2008-018839 A   1/2008
JP  2011-073615 A   4/2011
JP  2013-216251 A  10/2013

OTHER PUBLICATIONS

Apr. 11, 2017 International Search Report issued in International Patent Application PCT/JP2017/007352.

*Primary Examiner* — Quang Pham
(74) *Attorney, Agent, or Firm* — Oliff PLC (57) ABSTRACT

An in-vehicle device controls activation and deactivation of a monitoring device configured to monitor a suspicious person around the vehicle, and if a suspicious person is detected by the monitoring device, the in-vehicle device executes predetermined processing related to security of a user of the vehicle. The in-vehicle device includes a transmission unit configured to, if a motor of the vehicle is stopped, intermittently transmit a signal from a transmission antennas with which the vehicle is provided, a reception unit
(Continued)

configured to receive a response signal transmitted from a portable device that has received this signal, and a controller configured to activate the monitoring device if the response signal is received.

6 Claims, 6 Drawing Sheets

(56) References Cited

U.S. PATENT DOCUMENTS

| | | | | |
|---|---|---|---|---|
| 8,816,841 B2* | 8/2014 | Gustavsson | | B60Q 1/46 340/433 |
| 8,854,197 B2* | 10/2014 | Ikeda | | G08G 1/165 340/425.5 |
| 10,043,326 B2* | 8/2018 | DeCia | | B60N 2/002 |
| 2002/0003472 A1* | 1/2002 | Haruna | | B60R 25/04 340/426.13 |
| 2003/0210807 A1* | 11/2003 | Sato | | G06K 9/00805 382/104 |
| 2003/0222758 A1* | 12/2003 | Willats | | B60R 25/04 340/5.72 |
| 2005/0024257 A1* | 2/2005 | Britton | | G01S 7/412 342/70 |
| 2006/0103529 A1* | 5/2006 | Ohmura | | B60R 25/1001 340/568.1 |
| 2007/0120644 A1* | 5/2007 | Seike | | B60R 25/2072 340/5.61 |
| 2009/0079553 A1* | 3/2009 | Yanagi | | B60R 1/00 340/435 |
| 2012/0056734 A1 | 3/2012 | Ikeda et al. | | |
| 2014/0028440 A1* | 1/2014 | Takeuchi | | G05B 1/01 340/5.61 |
| 2014/0320823 A1* | 10/2014 | Ammar | | B60R 1/12 353/13 |
| 2015/0009285 A1* | 1/2015 | Morishima | | B60R 1/00 348/36 |
| 2015/0332530 A1* | 11/2015 | Kishita | | B60R 25/245 70/256 |
| 2016/0097853 A1* | 4/2016 | Kamo | | G01S 13/345 342/70 |
| 2016/0247403 A1* | 8/2016 | Krauss | | B60R 25/2054 |
| 2016/0297400 A1* | 10/2016 | Krishnan | | B60R 25/241 |
| 2016/0378104 A1* | 12/2016 | Hiei | | B60Q 9/00 701/2 |
| 2018/0208060 A1* | 7/2018 | Kim | | B60W 50/038 |
| 2019/0003213 A1* | 1/2019 | Yokomori | | B60J 5/00 |

* cited by examiner

IN-VEHICLE DEVICE AND VEHICLE SECURITY SYSTEM

TECHNICAL FIELD

The present disclosure relates to an in-vehicle device and a vehicle security system.

This application is based upon and claims the benefit of priority from Japanese Patent Application No. 2016-37331, filed on Feb. 29, 2016, the entire content of which is incorporated herein by reference.

BACKGROUND ART

Patent Document 1 discloses a vehicle anti-theft apparatus configured to prevent theft of a parked vehicle. The vehicle anti-theft apparatus determines the situation around the vehicle based on the output from a vehicle exterior camera, a radar, and a proximity sensor, and issues a warning to a suspicious person by turning on an indoor light, or ringing a horn, for example.

On the other hand, when a user sits in a parked vehicle, a suspicious person may suddenly enter the vehicle from its unlocked door, and the user may be victim to a crime. In order to monitor suspicious persons, it is conceivable to utilize the vehicle anti-theft apparatus disclosed in Patent Document 1.

CITATION LIST

Patent Documents

Patent Document 1: JP 2006-117121A

SUMMARY

Technical Problem

An in-vehicle device according to one aspect controls activation and deactivation of a monitoring device configured to monitor a suspicious person around a vehicle, and if a suspicious person is detected by this monitoring device, the in-vehicle device executes predetermined processing related to security of a user of a vehicle, the in-vehicle device including a transmission unit configured to, if the vehicle is stopped, intermittently transmit a signal to the outside of the vehicle from a transmission antenna with which the vehicle is provided, and a reception unit configured to receive a response signal transmitted from a portable device that has received the signal transmitted by the transmission unit, and a controller configured to activate the monitoring device if the reception unit has received the response signal.

Note that the present application can be realized as not only the in-vehicle device including such a distinctive controller but also a control method including a step of performing this distinctive control, or a program for causing a computer to execute such a step. Also, the present application can be realized as a semiconductor integrated circuit that realizes part or all of the in-vehicle device, or as another system including the in-vehicle device.

BEST MODES

Problems to be Solved

The vehicle anti-theft apparatus disclosed in Patent Document 1 constantly monitors the periphery of the vehicle while the vehicle is parked, and is problematic in that the apparatus consumes the battery significantly.

An object of the present disclosure is to provide an in-vehicle device and a vehicle security system capable of reducing the amount of a battery consumed by a monitoring device, by activating its monitoring function only before and after a user sits in a vehicle.

Advantageous Effects

According to the present disclosure, it is possible to provide an in-vehicle device and a vehicle security system capable of reducing the amount of a battery consumed by a monitoring device, by activating its monitoring function only before and after a user sits in a vehicle.

DESCRIPTION OF EMBODIMENTS

First, embodiments will be described. Also, at least portions of embodiments described below may be combined.

(1) An in-vehicle device according to one aspect controls activation and deactivation of a monitoring device configured to monitor a suspicious person around the vehicle, and execute predetermined processing related to security of a user of the vehicle if a suspicious person is detected by the monitoring device, the in-vehicle device including a transmission unit configured to, if the vehicle is stopped, intermittently transmit a signal to at least the outside of the vehicle from a transmission antenna with which the vehicle is provided, a reception unit configured to receive a response signal transmitted from a portable device that has received the signal transmitted from the transmission unit, and a controller configured to activate the monitoring device if the reception unit has received the response signal.

According to this aspect, if the vehicle is stopped, the in-vehicle device intermittently transmits a signal to the outside of the vehicle, and when the in-vehicle device receives a response signal from the portable device that has received this signal, the in-vehicle device activates the monitoring device. If the activated monitoring device detects a suspicious person, predetermined processing related to security is executed. Thus, power consumed by the monitoring device can be reduced by activating the monitoring device if a user who possesses a portable device is present around the vehicle.

(2) It is preferable that if a predetermined time period has elapsed from reception of the response signal, the controller deactivates the monitoring device.

According to this aspect, if a predetermined time period has elapsed from the reception of the response signal transmitted from the portable device, that is, if no suspicious person has been detected and the predetermined time period has elapsed without execution of predetermined processing related to security, then, power consumed by the monitoring device can be reduced by deactivating the monitoring device.

(3) It is preferable that if a predetermined time period has elapsed from when a door of the vehicle was unlocked, the controller deactivates the monitoring device.

According to this aspect, if a predetermined time period has elapsed from when the door of the vehicle was unlocked, that is, if no suspicious person has been detected even after the door of the vehicle was unlocked and a predetermined time period has elapsed without execution of predetermined processing related to security, power consumed by the monitoring device can be reduced by deactivating the monitoring device.

(4) It is preferable that if a predetermined time period has elapsed from when the vehicle was activated, the controller deactivates the monitoring device.

According to this aspect, if a motor is activated, power consumed by the monitoring device can be reduced by deactivating the monitoring device.

(5) It is preferable that the predetermined processing includes at least one of processing in which an interior light or an exterior light of the vehicle is turned on, processing in which a horn of the vehicle is honked, processing in which an open or close door of the vehicle is locked, and processing in which information related to the suspicious person is wirelessly transmitted to the outside.

According to this aspect, if a suspicious person is detected by the monitoring device, then, the in-vehicle device turns on the interior light or the exterior light, and thereby the safety of the user can be ensured.

Also, if a suspicious person is detected, the safety of the user can be ensured by honking the horn.

Moreover, if a suspicious person is detected, the safety of the user can be ensured by locking the doors.

Furthermore, if a suspicious person is detected, the safety of the user can be endured by wirelessly transmitting information related to this suspicious person to the outside.

(6) A vehicle security system according to this aspect includes the in-vehicle device according to any one of the aspects (1) to (5), the monitoring device configured to monitor a suspicious person around the vehicle, and the portable device configured to receive a signal transmitted from the in-vehicle device and transmit a response signal.

According to this aspect, similarly to the aspect (1), if a user who possesses the portable device is present around the vehicle, the monitoring device is activated, and thereby, power consumed by the monitoring device can be reduced.

DETAILED DESCRIPTION OF EMBODIMENTS

Hereinafter, specific examples of an in-vehicle device 1 and a vehicle security system according to embodiments of the present embodiment will be described below with reference to drawings. Note that the present embodiment is not limited to these examples, but is indicated by the scope of the claims, and all changes that come within the meaning and range of equivalency of the claims are intended to be embraced therein.

Figure 1:
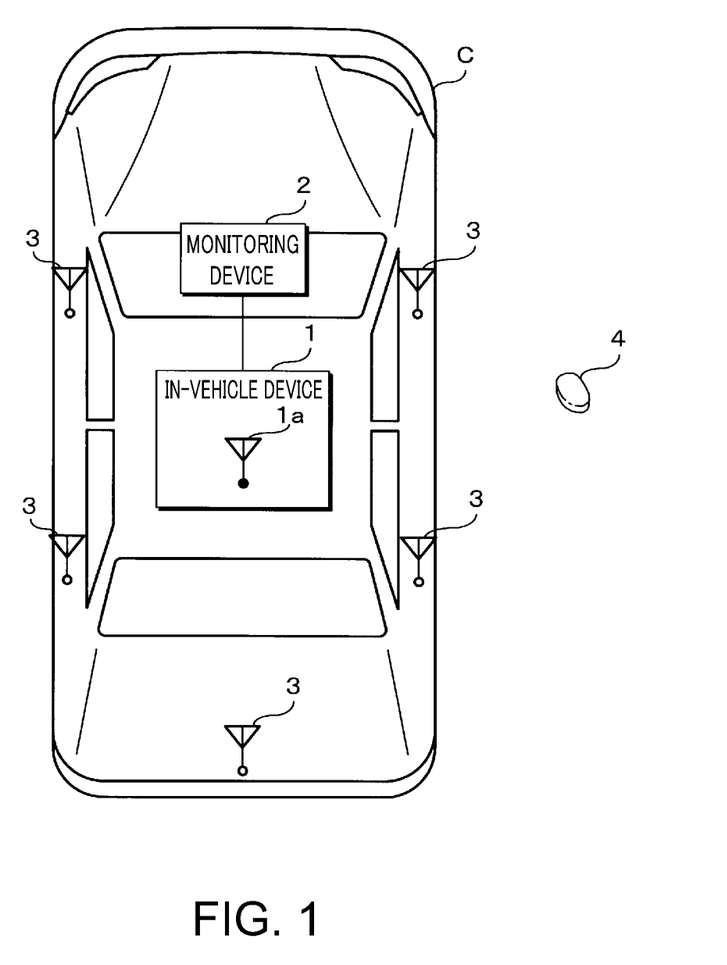
FIG. 1 is a schematic diagram showing one configuration example of a vehicle security system.

FIG. 1 is a schematic diagram showing one configuration example of a vehicle security system. The vehicle security system according to the present embodiment includes an in-vehicle device 1 configured to transmit and receive various signals using a plurality of LF transmission antennas 3 and an RF reception antenna 1a that are provided in a vehicle C, a monitoring device 2 configured to monitor suspicious persons around the vehicle, and a portable device 4 configured to transmit and receive the signals to/from this in-vehicle device 1. The plurality of LF transmission antennas 3 are provided around doors provided on the vehicle, for example, and mainly transmit detection signals for detecting the portable device 4 to the outside of the vehicle. Note that an LF band is an example of radio bands for transmitting signals, and is not necessarily limited thereto.

If the vehicle C provided with the in-vehicle device 1 is parked, the in-vehicle device 1 detects the portable device 4 around the vehicle by regularly transmitting detection signals, and if the portable device 4 is detected, the in-vehicle device 1 activates the monitoring device 2 and executes processing for monitoring the periphery of the vehicle and security.

Figure 2:
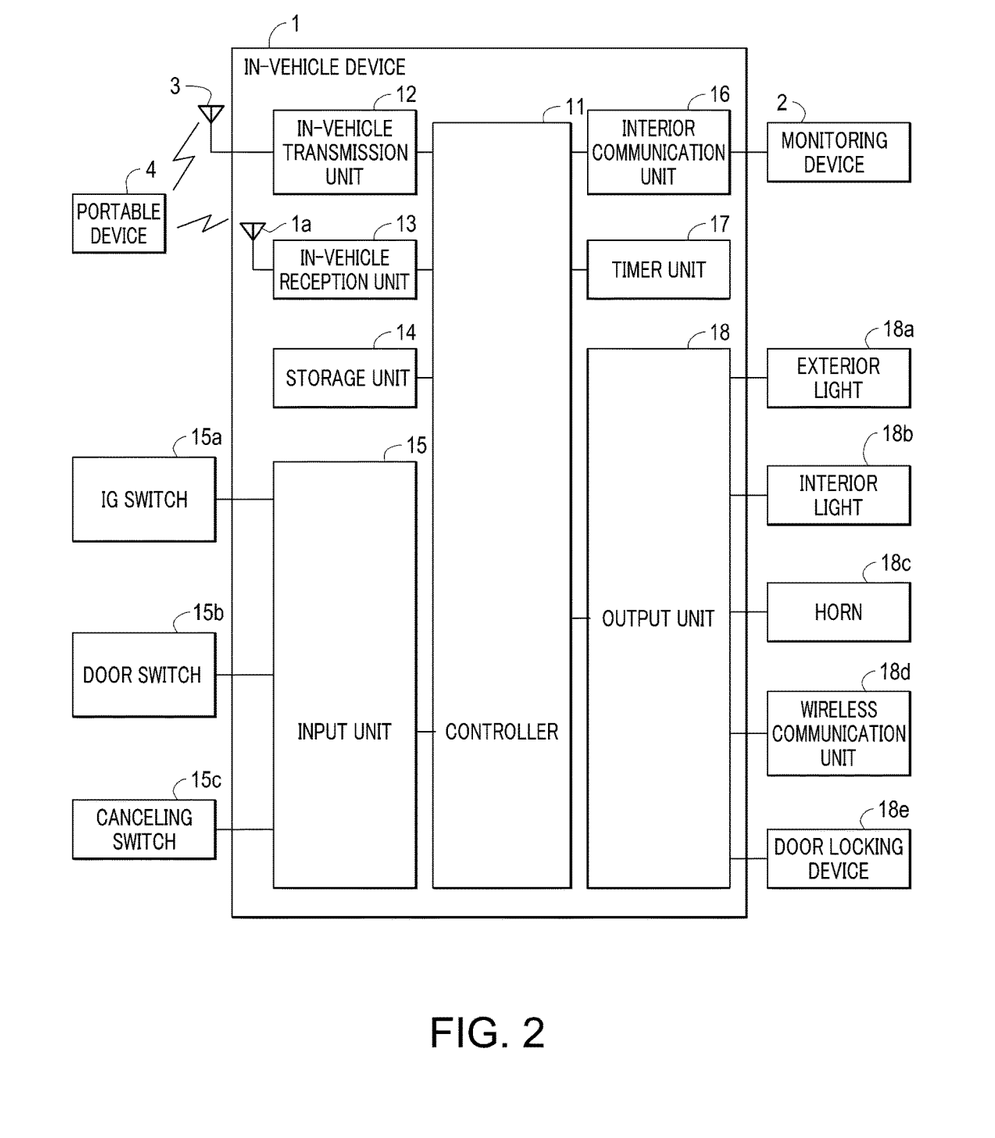
FIG. 2 is a block diagram showing one configuration example of an in-vehicle device.
Figure 3:
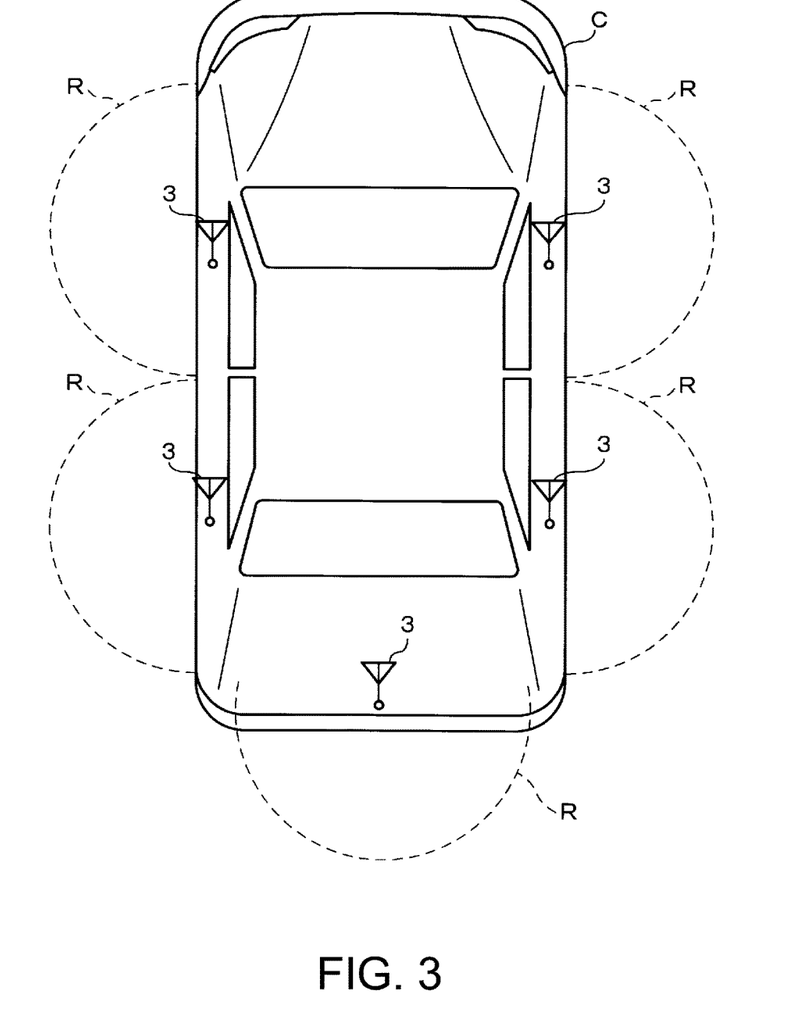
FIG. 3 is a schematic diagram showing a range in which detection signals that are transmitted from LF transmission antennas reach.

FIG. 2 is a block diagram showing one configuration example of the in-vehicle device 1, and FIG. 3 is a schematic diagram showing a range in which detection signals transmitted from the LF transmission antennas 3 reach. The in-vehicle device 1 includes the controller 11 configured to control operations of the constituent components of the in-vehicle device 1. The controller 11 is a microcomputer having one or more CPUs (Central Processing Units), or a multicore CPU, for example. The controller 11 is provided with an in-vehicle transmission unit 12, an in-vehicle reception unit 13, a storage unit 14, an input unit 15, an interior communication unit 16, a timer unit 17, and an output unit 18.

The controller 11 controls operations of the constituent components by executing a control program that is stored in the storage unit 14 and will be described later, and executes processing related to monitoring suspicious persons and security.

The in-vehicle transmission unit 12 is connected to the plurality of LF transmission antennas 3, and transmits detection signals for detecting the position of the portable device 4 under the control of the controller 11. As shown in FIG. 3, for example, the LF transmission antennas 3 are provided around a driver seat door, a passenger seat door, left and right rear seat doors, and a back door of the vehicle C, and transmit detection signals to at least the outside of the vehicle. Because the signals transmitted from the LF transmission antennas 3 are LF-band radio waves, the range in which the detection signals reach is a predetermined range R having a spherical shape about each LF transmission antenna 3, an elliptic shape, or a dumbbell-shape.

Also, if a method for detecting the position of the portable device 4 based on the intensity of the detection signals that are transmitted from the plurality of LF transmission antennas 3 and received by the portable device 4, then the intensity of the detections signals transmitted from the LF transmission antennas 3 should be set such that the portable device 4 that is located inside or outside the vehicle can receive detections signals that are transmitted from two or more LF transmission antennas 3.

Note that if the vehicle C is parked, the in-vehicle transmission unit 12 regularly transmits detection signals in order to detect the portable device 4 that is approaching the vehicle C.

The in-vehicle reception unit 13 is connected to the RF reception antenna 1a, receives various signals such as a response signal that are transmitted from the portable device 4 using UHF-band radio waves, and outputs the received signals to the controller 11. Because the UHF-band radio waves have a wide communicable region, there is no particular limitation on the arrangement of the RF reception antenna 1a in the vehicle C.

The storage unit 14 is a non-volatile memory such as an EEPROM (Electrically Erasable Programmable ROM) or a flash memory. The controller 11 controls operations of the constituent components of the in-vehicle device 1, and thereby, the storage unit 14 stores a control program for executing processing related to monitoring suspicious persons and security.

An ignition (IG) switch 15a, a door switch 15b, and a canceling switch 15c are connected to the input unit 15.

The ignition switch 15a is for starting a motor of the vehicle C, and is configured to output, to the controller 11, a signal corresponding to the position at which the ignition switch 15a is operated. The controller 11 can recognize whether or not the motor is started or operating, using the signal corresponding to the position at which the ignition switch 15a is operated. If a smart start (registered trademark) system is installed in the vehicle C, a configuration may also be adopted in which a signal related to the state in which the motor is operated by a smart start (registered trademark) button being operated is received and the state in which the motor is operated is recognized.

The door switch 15b is for locking and unlocking vehicle doors from the outside of the vehicle, and is configured to output, to the controller 11, a door signal corresponding to the state in which the door switch 15b is operated. The controller 11 can recognize the state in which the vehicle doors are operated, based on the door signal received from the door switch 15b. The door switch 15b is a request switch for locking or unlocking the vehicle door on the driver seat, for example, and a door handle outside the driver seat is provided with the door switch 15b. Note that the door handle may also be provided with a contact sensor configured to detect a user contact with the door handle, instead of a push button request switch. The controller 11 may also directly acquire a door signal corresponding to the operation of the door switch 15b, or may also acquire a door signal via an ECU (Electronic Controller) or the like.

The canceling switch 15c is for canceling a securing function, and is configured to output, to the controller 11, a canceling signal corresponding to the state in which the canceling switch 15c is operated. The controller 11 can recognize a user operation for canceling the security function via the canceling signal. Examples of the canceling switch 15c include a button switch provided on a center console in the vehicle interior, a driver door, a steering wheel, or the like, a soft switch displayed on a touch panel of a navigation device, and a button switch provided on an air conditioner operation panel.

The interior communication unit 16 is a communication circuit configured to perform communication in accordance with a communication protocol such as a CAN (Controller Area Network) or a LIN (Local Interconnect Network), and the interior communication unit 16 is connected to the monitoring device 2. The interior communication unit 16 transmits an activation signal for instructing activation of the monitoring device 2, a deactivation signal for instructing deactivation of the monitoring device 2, and the like, under the control of the controller 11. Also, the interior communication unit 16 receives a monitoring result transmitted from the monitoring device 2, and the controller 11 acquires the monitoring result via the interior communication unit 16.

The timer unit 17 starts clocking a time period under the control of the controller 11, and provides the controller 11 with the clocking result. The timer unit 17 is for clocking the timing at which the monitoring device 2 is deactivated.

An exterior light 18a, an interior light 18b, a horn 18c, a wireless communication unit 18d, and a door locking device 18e are connected to the output unit 18.

The interior light 18b is a room lamp provided on a ceiling portion of the vehicle interior. The exterior light 18a is a head light, or a light source provided on a door mirror or a door of the vehicle C, for example. The controller 11 turns on/off the interior light 18b and the exterior light 18a by outputting an on signal or an off signal.

The horn 18c is a device configured to output sound for issuing an alarm or a warning, and is utilized to intimidate suspicious persons in the present embodiment. The controller 11 outputs a driving signal to honk the horn 18c and accordingly causes the horn 18c to output sound for intimidation.

The wireless communication unit 18d transmits information related to suspicious persons to an external device via a wireless communication network such as a wireless LAN, a telephone network, or the like, in accordance with the instruction from the controller 11. The external device is a portable communication terminal possessed by an acquaintance of the user, or a communication device installed in an institution related to crime prevention, for example.

The door locking device 18e includes a locking mechanism for locking and unlocking the vehicle doors and an actuator for driving this locking mechanism. The door locking device 18e drives the actuator under the control of the controller 11, and locks and unlocks the vehicle doors.

Although, in FIG. 2, various switches and devices are illustrated as being directly connected to the input unit 15 and the output unit 18 of the in-vehicle device 1, various switches and devices may also be directly connected with signal wires, connected via an in-vehicle communication network such as a CAN or a LIN, or connected via another ECU.

Figure 4:
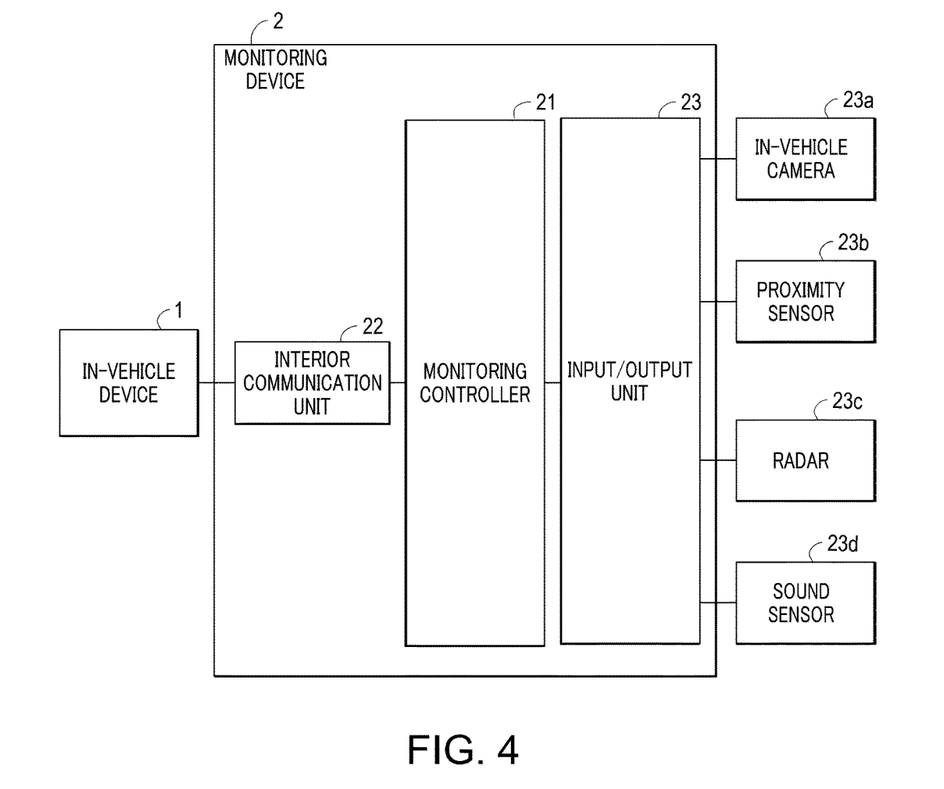
FIG. 4 is a block diagram showing one configuration example of a monitoring device.

FIG. 4 is a block diagram showing one configuration example of the monitoring device 2. The monitoring device 2 includes a monitoring controller 21, an interior communication unit 22, and an input/output unit 23, and receives power supplied from a power supply device (not shown) to operate. The monitoring controller 21 is a microcomputer having one or more CPUs (Central Processing Units), or a multicore CPU, for example, and controls overall operations of the monitoring device 2. The configuration of the interior communication unit 22 is similar to that of the interior communication unit 16, and the monitoring controller 21 transmits and receives various signals to/from the in-vehicle device 1 via the interior communication unit 22. If the interior communication unit 22 receives a deactivation signal transmitted from the in-vehicle device 1, then the monitoring device 2 shifts to a standby state, and stops operating. If the interior communication unit 22 receives an activation signal transmitted from the in-vehicle device 1, then the monitoring device 2 is activated from the standby state and resumes an activation state. Note that "standby state" is a state in which power consumed by the monitoring device 2 is lower than in the activation state, and only part of functions of the interior communication unit 22 operates, such as monitoring a signal transmitted from the in-vehicle device 1.

An in-vehicle camera 23a, a proximity sensor 23b, a radar 23c, and a sound sensor 23d are connected to the input/output unit 23, and operations of various devices are controlled by the monitoring controller 21.

The in-vehicle camera 23a captures an image of the periphery of the vehicle, and outputs data on the captured image to the monitoring controller 21. A monocular camera or a stereoscopic camera can be used as the in-vehicle camera 23a. The in-vehicle camera 23a may also capture an image of a suspicious person with visible light, or may also capture an image of a suspicious person with infrared rays. The monitoring controller 21 acquires image data from the in-vehicle camera 23a via the input/output unit 23.

The proximity sensor 23b detects a suspicious person around the vehicle by ultrasonic waves or infrared rays, for example, and outputs the detection result to the monitoring controller 21. The proximity sensor 23b is provided on both sides in the width direction of a front portion or a rear portion of the vehicle C, or at a substantially central portion in the width direction of the front portion or the rear portion of the vehicle C. Note that a clearance sonar may be utilized as the proximity sensor 23b configured to detect suspicious persons.

The radar 23c is a millimeter wave radar, a laser radar, or an ultrasonic radar, for example, and outputs the detection result to the monitoring controller 21.

The monitoring controller 21 identifies or detects suspicious persons who are present around the vehicle by analyzing the acquired image data, and the results detected by the proximity sensor 23b, the radar 23c, and the sound sensor 23d. The suspicious person is identified by deep learning, for example. Deep learning is one type of machine learning, and classifies the images and the results detected by the sensors into predetermined classes. The monitoring controller 21 learns a large amount of object images of obstacles such as walls and blocks around the vehicle doors, object images of suspicious persons, object images of objects such as buildings and vehicles around the vehicle, and movement patterns of the object images, and stores the characteristics of suspicious persons and classes corresponding to the characteristics as the learning results. The monitoring controller 21 specifies a class to which an object to be detected belongs, based on the acquired image data, the results detected by the sensors, and the learning results. Whether or not the object to be detected is a suspicious person is specified by specifying the class. The monitoring controller 21 transmits the detection results indicating whether a suspicious person is present to the in-vehicle device 1 using the interior communication unit 22.

Figure 5:
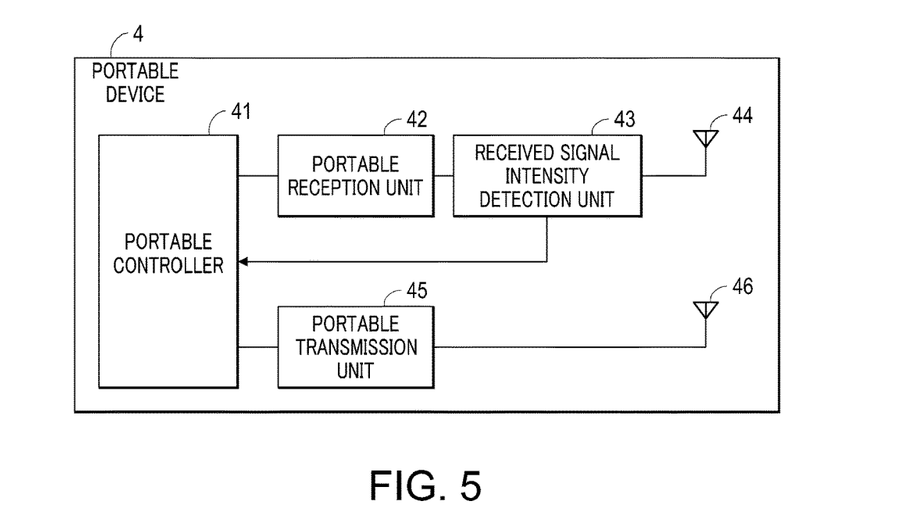
FIG. 5 is a block diagram showing one configuration example of a portable device.

FIG. 5 is a block diagram showing one configuration example of the portable device 4. The portable device 4 includes a portable controller 41 configured to control operations of constituent components of this portable device 4. The portable controller 41 is a microcomputer having one or more CPUs (Central Processing Units), or a multicore CPU, for example. The portable controller 41 is provided with a portable reception unit 42 and a portable transmission unit 45.

The portable controller 41 reads out a control program that is stored in a storage unit for a portable device (not shown) and will be described later, and controls operations of the constituent components, and thereby executes processing for transmitting information required to detect the position of the portable device 4 with respect to the vehicle C, to the in-vehicle device 1.

The portable reception unit 42 is connected to an LF reception antenna 44 via a received signal intensity detection unit 43, receives various signals transmitted using LF-band radio waves from the in-vehicle device 1, and outputs the received signals to the portable controller 41. The LF reception antenna 44 is a triaxial antenna, for example, and a constant received signal intensity can be obtained irrespective of the direction or the orientation of the portable device 4 with respect to the vehicle C.

The received signal intensity detection unit 43 is a circuit configured to detect the intensity of a detection signal received by the LF reception antenna 44, and output the intensity of the received signal that was detected, to the portable controller 41.

The portable transmission unit 45 is connected to the RF transmission antennas 46, and transmits a response signal corresponding to the detection signal transmitted from the in-vehicle device 1, using UHF-band radio waves, under the control of the portable controller 41. The response signal includes information indicating success or failure of reception and demodulation, or the intensity of the received detection signals that are transmitted from the LF transmission antennas 3. Note that an LF band is an example of radio bands for transmitting signals, and is not necessarily limited thereto.

Figure 6:
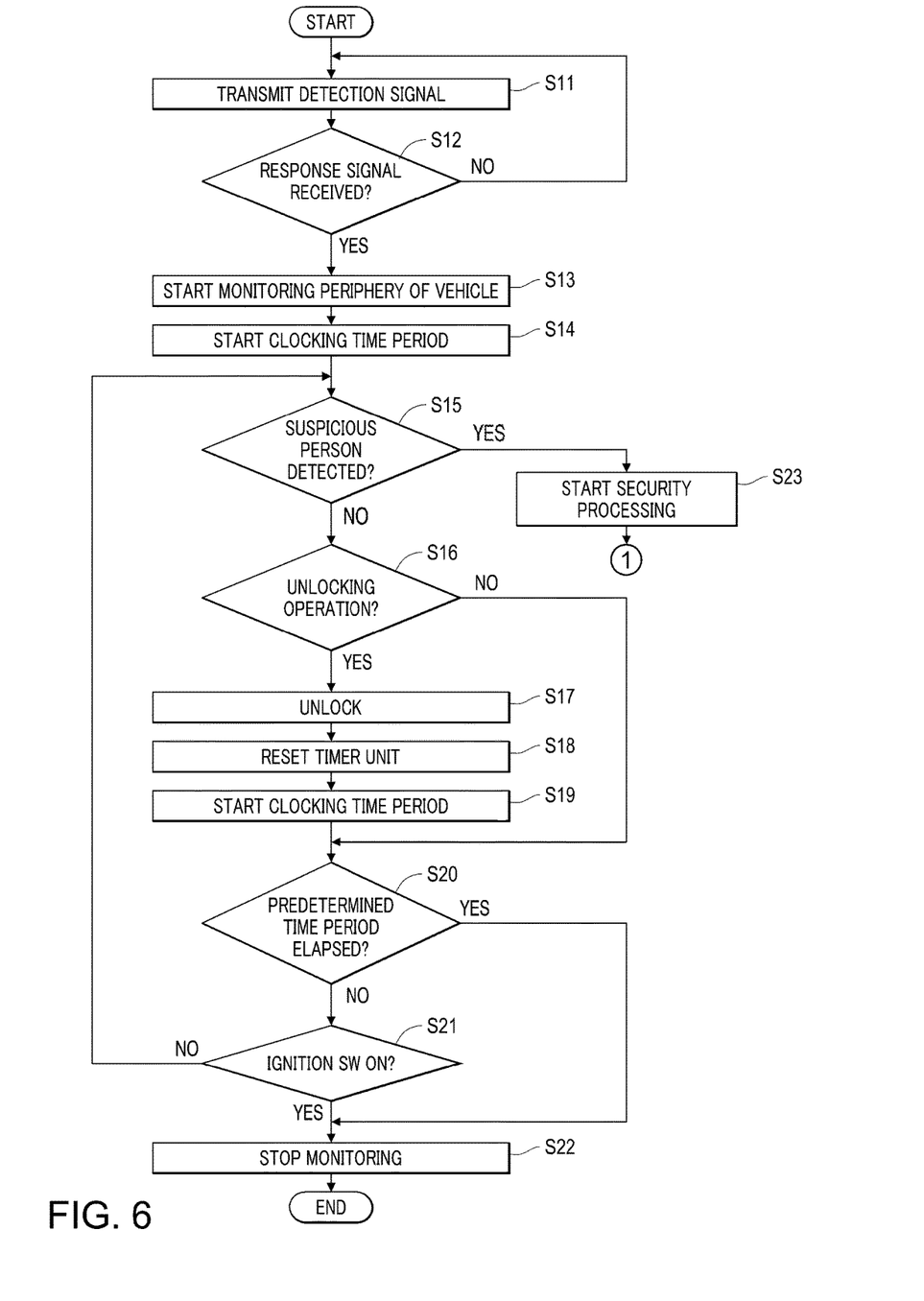
FIG. 6 is a flowchart showing a processing procedure of a controller according to control for activating a monitoring device.
Figure 7:
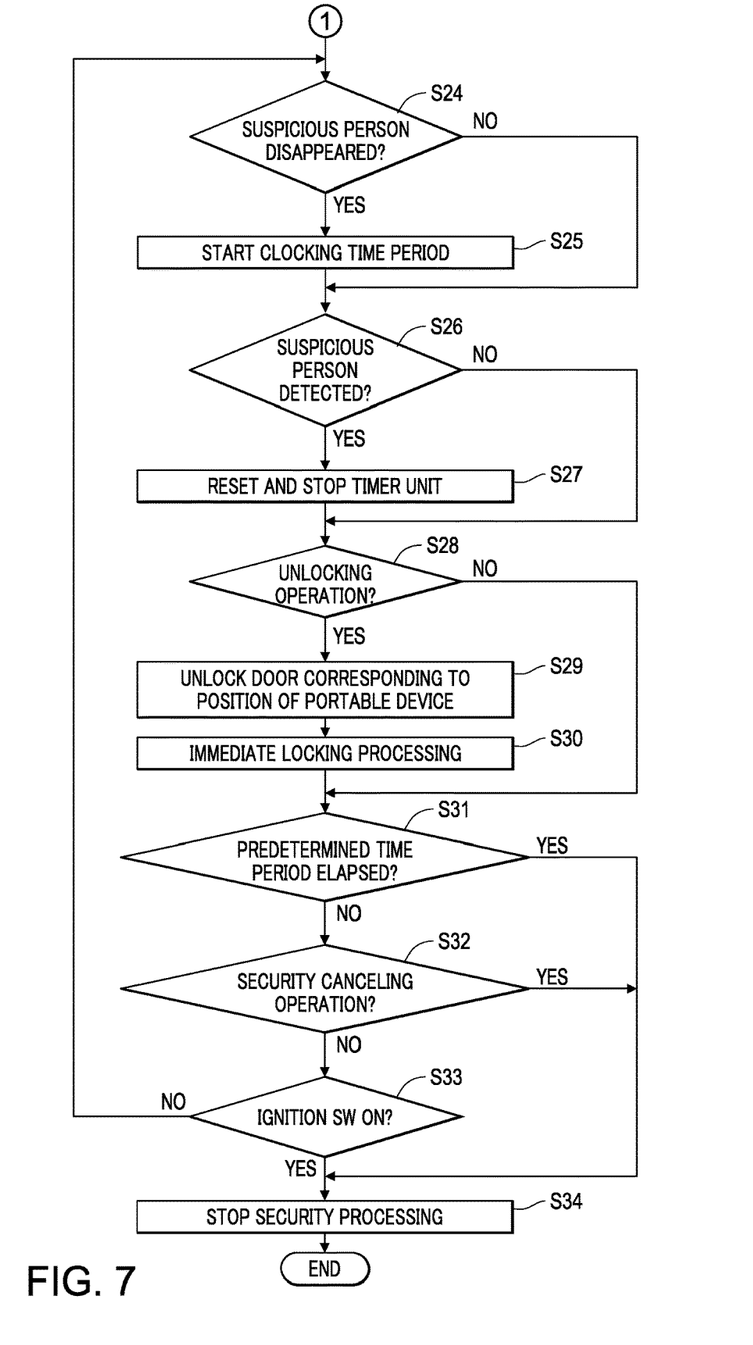
FIG. 7 is a flowchart showing a processing procedure of a controller according to control for activating a monitoring device.

FIGS. 6 and 7 are flowcharts showing processing procedures of the controller 11 according to control for activating the monitoring device 2. If the vehicle C is parked and stopped, the controller 11 of the in-vehicle device 1 executes the following processing. The controller 11 causes the in-vehicle transmission unit 12 to transmit a detection signal for detecting the portable device 4 around the vehicle (step S11), and determines whether or not a response signal transmitted from a legitimate portable device 4 located outside the vehicle has been received (step S12). If a method is adopted in which the portable device 4 located outside the vehicle is detected by success or failure of reception and demodulation of the detection signal in the portable device 4, when the controller 11 receives a response signal transmitted from the portable device 4 and the authentication of the portable device 4 is successful, the controller 11 determines, in step S12, that the response signal has been received. If a method is adopted in which the portable device 4 located outside the vehicle is detected using the intensity of the received detection signal, the controller 11 calculates the position of the portable device 4 based on the intensity of the received signal included in the response signal transmitted from the portable device 4, and determines whether or not the portable device 4 is located outside the vehicle. Moreover, if the portable device 4 is located outside the vehicle and the authentication of the portable device 4 is successful, then, the controller 11 determines, in step S12, that the response signal has been received.

If it is determined that the response signal has not been received (step S12: NO), then the controller 11 returns processing to step S11 and intermittently executes transmission of the detection signal. If it is determined that the response signal has been received (step S12: YES), the controller 11 causes the interior communication unit 16 to transmit an activation signal to the monitoring device 2, thereby activates the monitoring device 2, and starts monitoring the periphery of the vehicle (step S13). The controller 11 then starts clocking a time period (step S14). That is, the controller 11 measures the lapse of time from when the portable device 4 is detected.

Next, the controller 11 receives the detection result transmitted from the monitoring device 2, using the interior communication unit 16, and determines whether or not a suspicious person has been detected, based on the detection result (step S15). If it is determined that no suspicious person has been detected (step S15: NO), then the controller 11 references a door signal input to the input unit 15, and determines whether or not an unlocking operation has been performed by the door switch 15b (step S16).

If it is determined that the unlocking operation has been performed (step S16: YES), the controller 11 outputs an unlocking signal to the door locking device 18e such that the door locking device 18e unlocks the doors (step S17). The controller 11 then resets the timer unit 17 (step S18), and causes the timer unit 17 to start clocking a time period again (step S19). That is, the controller 11 measures the lapse of time from when the doors are unlocked.

If the process in step S19 has ended, or if it is determined, in step S16, that the unlocking operation has not been performed (step S16: NO), then, the controller 11 determines whether or not a predetermined time period has elapsed from when the timer unit 17 starts clocking a time period (step S20). If it is determined that the predetermined time period has not elapsed (step S20: NO), then the controller 11 determines whether or not the ignition switch 15a is operated and the motor is started (Step S21). If it is determined that the ignition switch 15a is not operated (step S21: NO), then the controller 11 returns the processing to step S15 and continues to monitor suspicious persons. If it is determined that the ignition switch 15a is operated (step S21: YES), or if it is determined, in step S20, that a predetermined time period has elapsed (step S20: YES), then the controller 11 causes the interior communication unit 16 to transmit a deactivation signal to the monitoring device 2, thereby deactivates the monitoring device 2, stops monitoring the periphery of the vehicle (step S22), and ends the processing.

If it is determined, in step S15, that a suspicious person has been detected (step S15: YES), the controller 11 starts predetermined security processing (step S23). For example, the controller 11 turns on the exterior light 18a and the interior light 18b. Also, the controller 11 honks the horn 18c and causes the horn 18c to output an intimidation sound. Furthermore, the controller 11 causes the wireless communication unit 18d to transmit information related to the suspicious person to an external device.

Next, the controller 11 determines whether or not the suspicious person has disappeared, based on the detection result transmitted from the monitoring device 2 (step S24). If it is determined that the suspicious person has disappeared (step S24: YES), then the controller 11 starts clocking a time period (step S25). That is, the controller 11 measures the lapse of time from when the suspicious person has disappeared.

If the process in step S25 has ended, or if it is determined that the suspicious person has not disappeared (step S24: NO), the controller 11 determines whether or not a suspicious person has been detected, based on the detection result transmitted from the monitoring device 2 (step S26). If it is determined that a suspicious person has been detected (step S26: YES), then the controller 11 resets the timer unit 17 and stops clocking a time period (step S27).

If the process in step S27 has ended, or if it is determined that no suspicious person is detected (step S26: NO), then the controller 11 refers to the door signal that is input to the input unit 15 and determines whether or not the unlocking operation has been performed by the door switch 15b (step S28). If it is determined that the unlocking operation has been performed (step S28: YES), then the controller 11 unlocks a door corresponding to the position of the portable device 4 (step S29), and locks this door immediately after the door is opened and closed (step S30). The controller 11 can detect the position of the portable device 4 from a transmitter that transmits the detection signal when the response signal is transmitted, and if the position of the operated door switch 15b corresponds to the position of the portable device 4, the controller 11 unlocks only this door. Also, performing wireless communication with the portable device 4 makes it possible to specify the position of the portable device 4, and similarly, to unlock only a door corresponding to the position of the portable device 4.

Moreover, the controller 11 detects opening/closing of a door by a courtesy switch (not shown) that is turned on/off by the opening/closing of a door of the vehicle C, for example, and if the door is opened or closed, then the controller 11 locks this door immediately.

If the process in step S30 has ended, or if it is determined that the unlocking operation has not been performed (step S28: NO), then the controller 11 determines whether or not a predetermined time period has elapsed from when the suspicious person has disappeared (step S31). If it is determined that the predetermined time period has not elapsed (step S31: NO), the controller 11 determines whether or not the canceling switch 15c configured to cancel security processing has been operated (step S32). If it is determined that the canceling switch 15c has not been operated (step S32: NO), then the controller 11 determines whether or not the ignition switch 15a is operated and the motor is started (step S33). If it is determined that the ignition switch 15a is not operated (step S33: NO), then the controller 11 returns the processing to step S24 and continues security processing. If it is determined that the ignition switch 15a has been operated (step S33: YES), or if it is determined, in step S31, that the predetermined time period has elapsed (step S31: YES), or if it is determined that the canceling switch 15c has been operated (step S32: YES), then the controller 11 stops the security processing (step S34) and ends the processing.

According to the vehicle security system configured as described above, if the vehicle C is parked, the monitoring device 2 stops main operations and reaches the standby state in which the monitoring device 2 receives only an activation instruction from the in-vehicle device 1. If the vehicle C provided with the in-vehicle device 1 is parked, the in-vehicle device 1 regularly transmits detection signals, and if the in-vehicle device 1 detects a legitimate portable device 4 located outside the vehicle, the in-vehicle device 1 activates the monitoring device 2 and causes the monitoring device 2 to monitor the periphery of the vehicle. Therefore, activation of the monitoring function only before and after a user sits in the vehicle C makes it possible to reduce the amount of the battery consumed by the monitoring device 2.

Also, if no suspicious person is detected and a predetermined time period has elapsed without execution of predetermined processing related to security, deactivation of the monitoring device 2 makes it possible to reduce power consumed by the monitoring device 2.

Moreover, that is, if no suspicious person is detected even after a door of the vehicle C is unlocked and a predetermined time period has elapsed without execution of predetermined processing related to security, deactivation of the monitoring device 2 makes it possible to reduce power consumed by the monitoring device 2.

Furthermore, if the motor is activated, deactivation of the monitoring device 2 makes it possible to reduce power consumed by the monitoring device 2.

LIST OF REFERENCE NUMERALS

1 In-vehicle device
1a RF reception antenna

2 Monitoring device
3 LF transmission antenna
4 Portable device
11 Controller
12 In-vehicle transmission unit
13 In-vehicle reception unit
14 Storage unit
15 Input unit
15a Ignition switch
15b Door switch
15c Canceling switch
16 Interior communication unit
17 Timer unit
18 Output unit
18a Exterior light
18b Interior light
18c Horn
18d Wireless communication unit
18e Door locking device
21 Monitoring controller
22 Interior communication unit
23 Input/Output unit
23a In-vehicle camera
23b Proximity sensor
23c Radar
23d Sound sensor
41 Portable controller
42 Portable reception unit
43 Received signal intensity detection unit
44 LF reception antenna
45 Portable transmission unit
46 RF transmission antenna
C Vehicle

The invention claimed is:

1. An in-vehicle device configured to control an activation and deactivation of a monitoring device associated with a vehicle, the monitoring device configured to monitor a periphery of the vehicle and detect a suspicious person, and the in-vehicle device configured to execute a predetermined processing related to security of a user getting into the vehicle if a suspicious person is detected by one or more sensors connected to the monitoring device after the activation of the monitoring device, the in-vehicle device comprising a processor and a memory having instructions stored which, when executed by the processor, cause the processor to:

determine if the vehicle is stopped, and as a result of determining that the vehicle is stopped, intermittently transmit a signal to at least the outside of the vehicle from a transmission antenna with which the vehicle is provided;

receive a response signal transmitted from a legitimate portable device associated with the user, that has received the transmitted signal; and activate the monitoring device if the processor has received the response signal from the legitimate portable device, wherein the processor:

if the suspicious person is no longer detected based on sensing information of the one or more sensors connected to the monitoring device after the predetermined processing related to security is started, measures a lapse of time from when the suspicious person is no longer detected based on the sensing information;

if the lapse of time has passed a predetermined time period from when the suspicious person is no longer detected based on the sensing information, stops the predetermined processing related to security; and if the lapse of time has not passed the predetermined time period from when the suspicious person is no longer detected based on the sensing information, and the user performs an unlocking operation, unlocks a door of the vehicle and automatically locks the door after the door is opened and closed.

2. The in-vehicle device according to claim 1, wherein, if a predetermined time period has elapsed from a reception of the response signal from the legitimate portable device, the processor deactivates the monitoring device.

3. The in-vehicle device according to claim 1, wherein, if a predetermined time period has elapsed from when a door of the vehicle was unlocked, the processor deactivates the monitoring device.

4. The in-vehicle device according to claim 1, wherein, if a predetermined time period has elapsed from when a motor of the vehicle was activated, the processor deactivates the monitoring device.

5. The in-vehicle device according to claim 1, wherein the predetermined processing related to security includes at least one of (i) processing in which an interior light or an exterior light of the vehicle is turned on (ii), processing in which a horn of the vehicle is honked, (iii) processing in which an open or close door of the vehicle is locked, and (iv) processing in which information related to the suspicious person is wirelessly transmitted to the outside.

6. A vehicle security system of a vehicle comprising:
the in-vehicle device according to claim 1:
the monitoring device configured to monitor a suspicious person around the vehicle; and
the portable device configured to receive a signal transmitted from the in-vehicle device and transmit a response signal.

* * * * *